US012718511B2

(12) United States Patent
Yamamoto et al.

(10) Patent No.: US 12,718,511 B2
(45) Date of Patent: Aug. 25, 2026

(54) INFORMATION PROCESSING APPARATUS, INFORMATION PROCESSING METHOD, AND COMPUTER PROGRAM

(71) Applicant: Sony Group Corporation, Tokyo (JP)

(72) Inventors: Yuki Yamamoto, Chiba (JP); Tokuhiro Nishikawa, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 275 days.

(21) Appl. No.: 18/578,212

(22) PCT Filed: Mar. 29, 2022

(86) PCT No.: PCT/JP2022/015603

§ 371 (c)(1),
(2) Date: Jan. 10, 2024

(87) PCT Pub. No.: WO2023/007859

PCT Pub. Date: Feb. 2, 2023

(65) Prior Publication Data

US 2024/0320945 A1 Sep. 26, 2024

(30) Foreign Application Priority Data

Jul. 27, 2021 (JP) ................................ 2021-122831

(51) Int. Cl.
*G06V 10/22* (2022.01)
*G06V 10/762* (2022.01)
*G06V 10/776* (2022.01)

(52) U.S. Cl.
CPC ........... *G06V 10/22* (2022.01); *G06V 10/762* (2022.01); *G06V 10/776* (2022.01)

(58) Field of Classification Search
CPC .... G06V 10/22; G06V 10/762; G06V 10/776; G06T 7/00; G06T 7/11
See application file for complete search history.

(56) References Cited

U.S. PATENT DOCUMENTS 10,121,068 B2 * 11/2018 Yamamoto ............ G06V 40/10
11,049,014 B2 * 6/2021 Suzuki .................. G06N 3/045
(Continued)

FOREIGN PATENT DOCUMENTS

JP 2016-018538 A 2/2016
JP 2018-013857 A 1/2018
(Continued)

*Primary Examiner* — Shefali D Goradia
(74) *Attorney, Agent, or Firm* — Paratus Law Group, PLLC

(57) ABSTRACT

An area including an object is detected from an input image with high accuracy. An information processing apparatus of the present disclosure includes: a first detection unit that performs detection processing of detecting an area including an object with respect to an input image; an identification unit that calculates a feature vector on the basis of an image of an area detected in the detection processing, identifies the object on the basis of the feature vector, and acquires identification reliability that is reliability of an identification result of the object; and a learning unit that selects a detection area for learning from a plurality of detection areas corresponding to a plurality of the feature vector on the basis of a plurality of the identification reliability, and learns a model that detects an area including the object on the basis of an image of the detection area selected.

14 Claims, 5 Drawing Sheets

(56) References Cited

U.S. PATENT DOCUMENTS

| | | | | |
|---|---|---|---|---|
| 2016/0012277 A1* | 1/2016 | Tate | ..................... | G06V 10/809<br>382/192 |
| 2021/0089823 A1* | 3/2021 | Iio | ........................ | G06V 10/776 |

FOREIGN PATENT DOCUMENTS

| | | |
|---|---|---|
| JP | 2020-046706 A | 3/2020 |
| JP | 2021-051589 A | 4/2021 |

* cited by examiner

FIG. 1

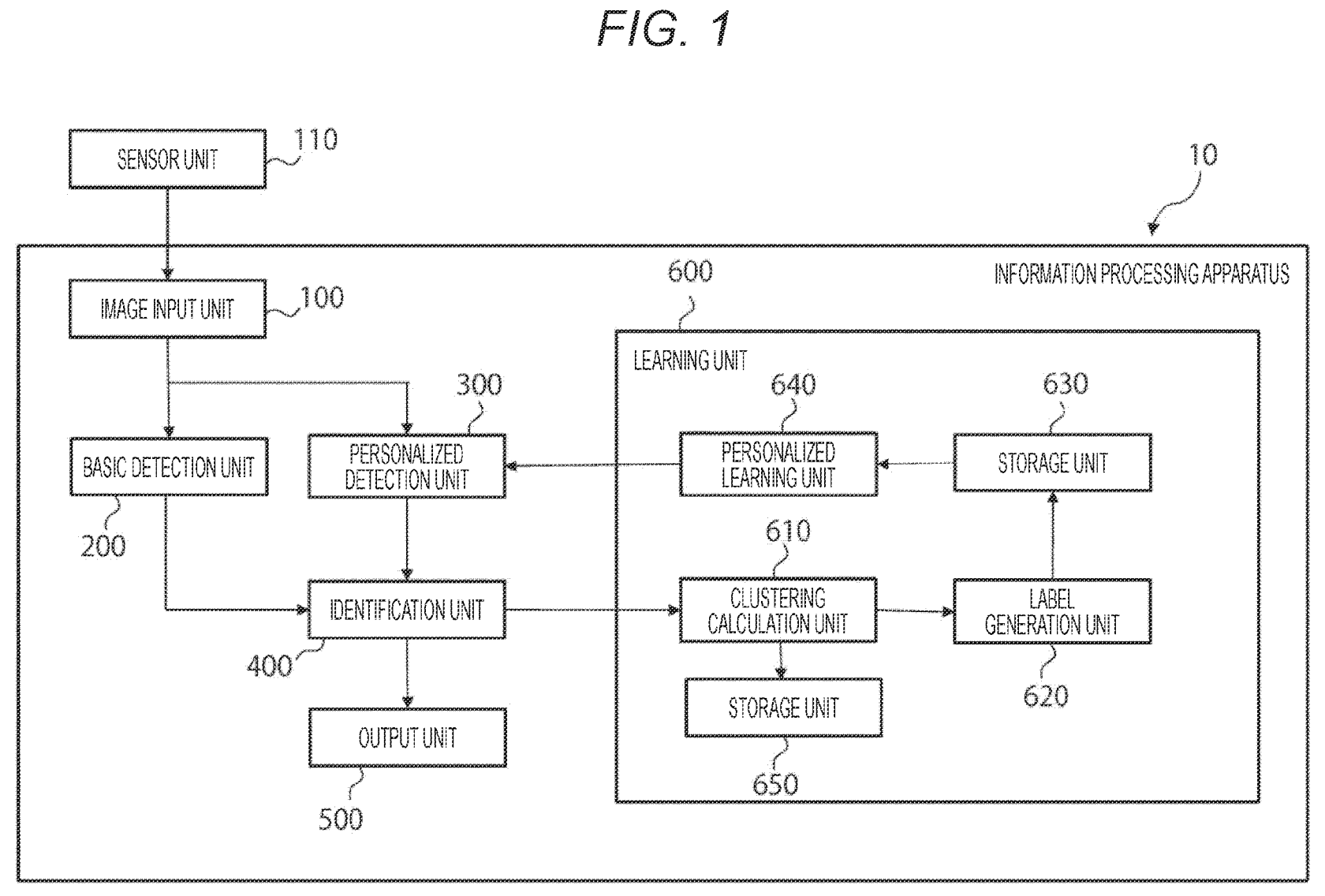

10
INFORMATION PROCESSING APPARATUS
110 SENSOR UNIT
100 IMAGE INPUT UNIT
200 BASIC DETECTION UNIT
300 PERSONALIZED DETECTION UNIT
400 IDENTIFICATION UNIT
500 OUTPUT UNIT
600 LEARNING UNIT
610 CLUSTERING CALCULATION UNIT
620 LABEL GENERATION UNIT
630 STORAGE UNIT
640 PERSONALIZED LEARNING UNIT
650 STORAGE UNIT

| INDEX | FEATURE VECTOR | IDENTIFICATION RELIABILITY | DETECTION RELIABILITY |
|---|---|---|---|
| 1 | F1_1, F2_1,···, F512_1 | R_1 | D_1 |
| 2 | F1_2, F2_2,···, F512_2 | R_2 | D_2 |
| ··· | ··· | ··· | ··· |

| INDEX | INPUT IMAGE | DETECTION AREA (LABEL) | FEATURE VECTOR | CLUSTER NAME |
|---|---|---|---|---|
| 1 | I_1 | x_1, y_1, w1, h1 | F1_1,F2_1,⋯,F512_1 | A |
| 2 | I_1 | x_2, y_2, w2, h2 | F1_2,F2_2,⋯,F512_2 | B |
| ⋯ | ⋯ | ⋯ | ⋯ | ⋯ |

| INDEX | DETECTION AREA IMAGE | FEATURE VECTOR | CLUSTER NAME |
|---|---|---|---|
| 1 | dI_1 | F1_1,F2_1,···,F512_1 | A |
| 2 | dI_2 | F1_2,F2_2,···,F512_2 | B |
| ··· | | ··· | ··· |

FIG. 8

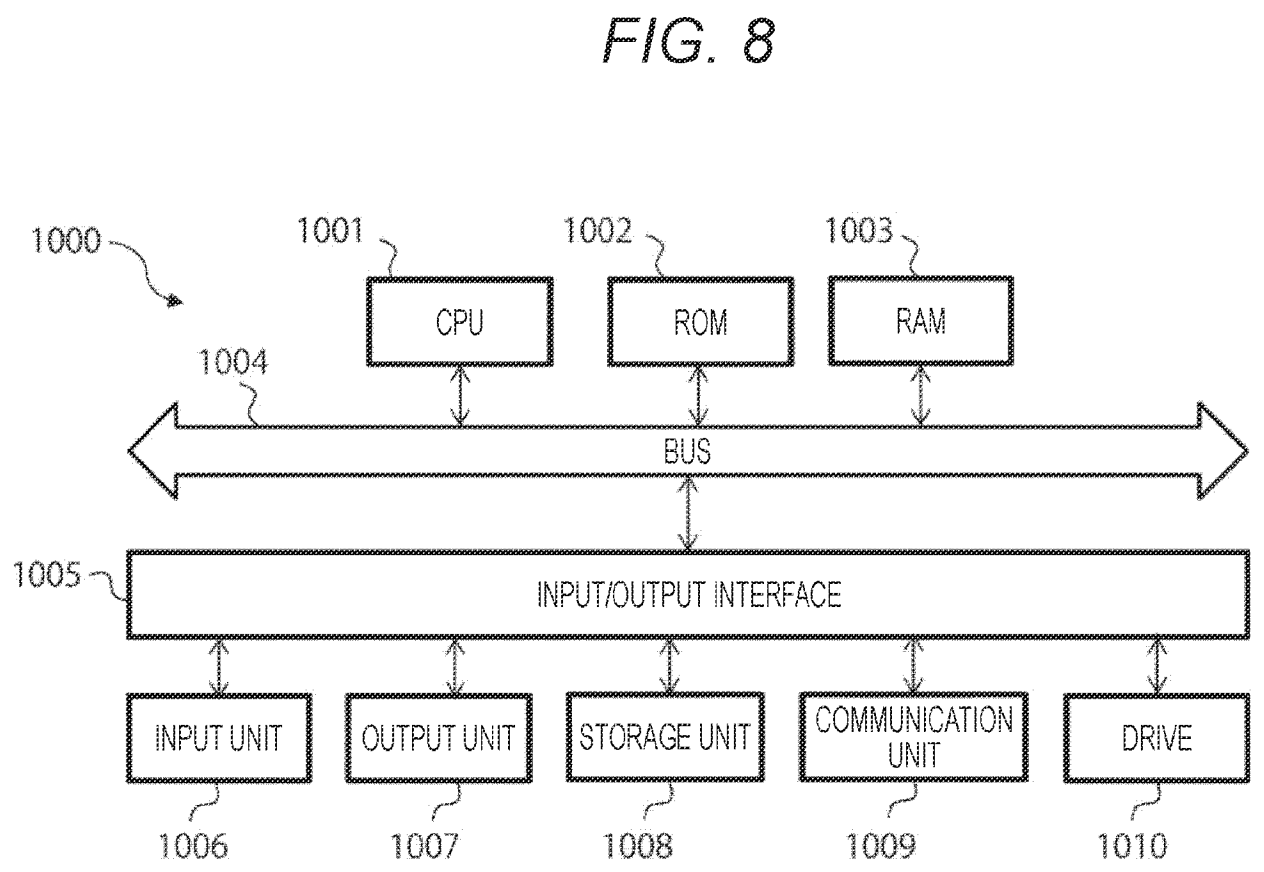

1000
1001 CPU
1002 ROM
1003 RAM
1004 BUS
1005 INPUT/OUTPUT INTERFACE
1006 INPUT UNIT
1007 OUTPUT UNIT
1008 STORAGE UNIT
1009 COMMUNICATION UNIT
1010 DRIVE

INFORMATION PROCESSING APPARATUS, INFORMATION PROCESSING METHOD, AND COMPUTER PROGRAM

CROSS REFERENCE TO PRIOR APPLICATION

This application is a National Stage Patent Application of PCT International Patent Application No. PCT/JP2022/015603 (filed on Mar. 29, 2022) under 35 U.S.C. § 371, which claims priority to Japanese Patent Application No. 2021-122831 (filed on Jul. 27, 2021), which are all hereby incorporated by reference in their entirety.

TECHNICAL FIELD

The present disclosure relates to an information processing apparatus, an information processing method, and a computer program.

BACKGROUND ART

In a robot such as a mobile robot or a home robot, it is common to detect an area including a target object from a captured input image and identify the object from an image of the detected area. For example, in a case where the target is a face, the face detection is processing of finding a face area from an image, and the face identification is processing of identifying an individual from an image of the face area. In order for the robot to function effectively, it is necessary to correctly detect an area including a target object.

CITATION LIST

Patent Document

Patent Document 1: Japanese Patent Application Laid-Open No. 2018-013857

SUMMARY OF THE INVENTION

Problems to be Solved by the Invention

The present disclosure has been made in view of the above-described problems, and an object thereof is to detect an area including an object from an input image with high accuracy.

Solutions to Problems

An information processing apparatus of the present disclosure includes: a first detection unit that performs detection processing of detecting an area including an object with respect to an input image; an identification unit that calculates a feature vector on the basis of an image of an area detected in the detection processing, identifies the object on the basis of the feature vector, and acquires identification reliability that is reliability of an identification result of the object; and a learning unit that selects a detection area for learning from a plurality of detection areas corresponding to a plurality of the feature vector on the basis of a plurality of the identification reliability, and learns a model that detects an area including the object on the basis of an image of the detection area selected.

An information processing method of the present disclosure executes: performing detection processing of detecting an area including an object with respect to an input image; calculating a feature vector on the basis of an image of an area detected in the detection processing, identifying the object on the basis of the feature vector, and acquiring identification reliability that is reliability of an identification result of the object; and selecting a detection area for learning from a plurality of detection areas corresponding to a plurality of the feature vector on the basis of a plurality of the identification reliability, and learning a model that detects an area including the object on the basis of an image of the detection area selected.

A computer program of the present disclosure causes a computer to execute: a step of performing detection processing of detecting an area including an object with respect to an input image; a step of calculating a feature vector on the basis of an image of an area detected in the detection processing, identifying the object on the basis of the feature vector, and acquiring identification reliability that is reliability of an identification result of the object; and a step of selecting a detection area for learning from a plurality of detection areas corresponding to a plurality of the feature vector on the basis of a plurality of the identification reliability, and learning a model that detects an area including the object on the basis of an image of the detection area selected.

BRIEF DESCRIPTION OF DRAWINGS

FIG. 1 is a block diagram of an information processing apparatus according to the present disclosure.

FIG. 8 is a diagram illustrating an example of a hardware configuration of a computer that executes a series of processes of the information processing apparatus of the present disclosure by a program.

MODE FOR CARRYING OUT THE INVENTION

Figures 2, 3:
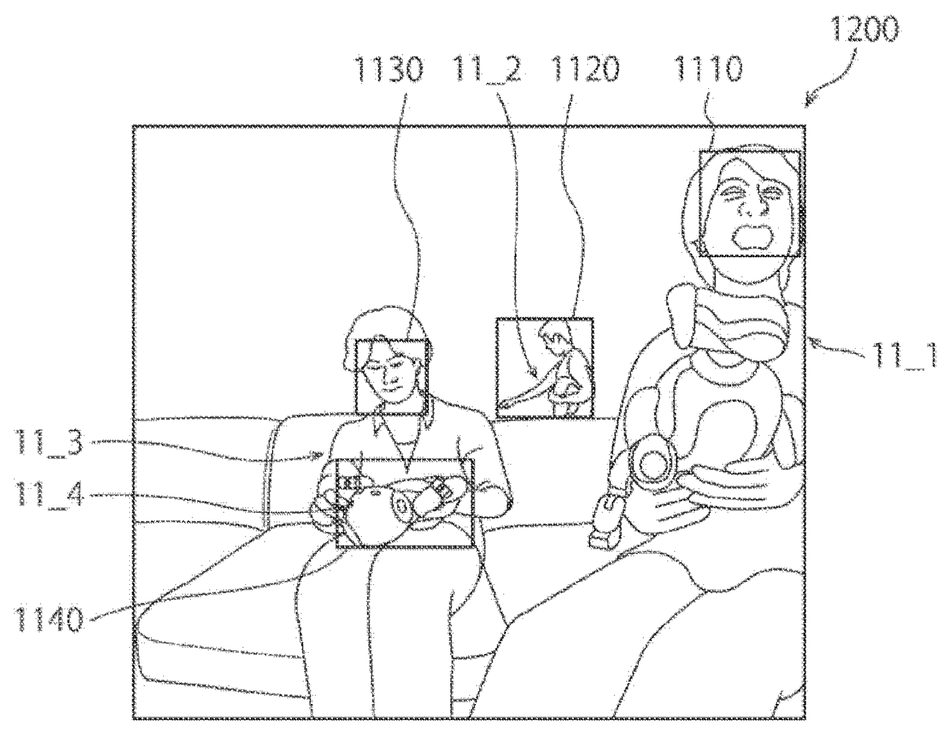
FIG. 2 is a diagram illustrating an example of an input image processed by the information processing apparatus according to the present disclosure.
FIG. 3 illustrates an example of correspondence data including a feature vector, detection reliability, and identification reliability.

FIG. 1 is a block diagram of an information processing apparatus 10 according to an embodiment of the present disclosure. The information processing apparatus 10 according to the present embodiment includes a sensor unit 110 that acquires an image by imaging, an image input unit 100 that receives an image from the sensor unit 110, a basic detection unit 200 that performs object detection processing using a model (basic model), and a personalized detection unit 300 that performs object detection processing using a model (personalized model). Furthermore, the information processing apparatus 10 includes an identification unit 400 that performs object identification processing on the basis of the image of the area detected by the basic detection unit 200 and the personalized detection unit 300, an output unit 500 that outputs an identification result of the object, and a learning unit 600 that generates the personalized model used by the personalized detection unit 300 by machine learning.

The basic detection unit 200 corresponds to a first detection unit according to the present disclosure, and the personalized detection unit 300 corresponds to a second detection unit according to the present disclosure.

In the present embodiment, the information processing apparatus 10 can be mounted on a movable robot such as a mobile robot or a home robot, or a movable device. However, the information processing apparatus 10 may be mounted on a fixedly installed device or system such as a fixedly installed monitoring device.

The sensor unit 110 includes a sensor device such as a camera that acquires an image by imaging. The image may be a still image or a moving image. Imaging may be performed at regular time intervals, or an image may be acquired at a timing when a predetermined event is satisfied. The timing may be, for example, a timing instructed by a user who operates the present device 10, a timing at which a voice of a predetermined pattern or a voice with a predetermined volume or more is detected by a microphone or the like, or a timing at which a person is detected by a human sensor. Alternatively, the timing may be a timing at which light of a predetermined pattern and light of a certain level or higher are detected by the optical sensor, or other timings.

The image input unit 100 receives an image from the sensor unit 110 and sends the received image as an input image to the basic detection unit 200 and the personalized detection unit 300.

FIG. 2 illustrates an example of an image 1200 acquired by the sensor unit 110. The image 1200 is an image captured in a certain home. A plurality of persons 11_1, 11_2, and 11_3 and a plurality of objects (sofa, pet robot, and the like) are illustrated. In the drawing, information (rectangular frame) indicating an area detected by detection processing by the personalized detection unit described later is also displayed, and details thereof will be described later.

The basic detection unit 200 and the personalized detection unit 300 perform detection processing of an area including an object to be detected from the input image. In the present embodiment, a case where an object is a part of a human body, more specifically, a human face will be described. However, the object to be detected may be a part other than the face, an animal other than a human (for example, a pet in a house) or a part thereof, an object (for example, furniture in a house) or a part thereof, or the like.

The basic detection unit 200 has a model (basic model) learned in advance with a basic data set, and performs detection processing of an area including an object using the basic model. The basic data set is a data set including a large number of images for each object to be detected. For example, in a case where the object is a face, the data set includes images of various faces. In a case where the object is a face, data including an image other than the face may also be included in the data set as a negative example to perform learning to improve the detection accuracy of the face area. In general, the basic detection unit 200 is assumed to perform detection at high speed and low accuracy, and is assumed to have a high reproduction rate (recall) although there are many erroneous detections (false positives). A general detector can also be used as the basic detection unit 200.

The basic detection unit 200 outputs information indicating the detected area and detection reliability (detection score) as a set. The basic detection unit 200 sends a set of information indicating the detected area and the detection reliability to the identification unit 400. The information indicating the area is, for example, a rectangle (bounding box) surrounding the object or the like. However, the shape of the area is not limited to a rectangle, and may be another shape such as a circle or a triangle.

The detection reliability (detection score) indicates the reliability of the detection result, that is, the reliability with respect to the detected area. The detection reliability may be a score itself output by the area detection algorithm used by the basic detection unit 200 as long as the detection reliability is a value correlated with the probability that the object exists in the rectangle (bounding box). Alternatively, the detection reliability may be a value based on uncertainty that can be acquired by the method disclosed in Gal, Yarin. Uncertainty in Deep Learning. 2016. That is, in deep learning, learning is performed by adding a dropout layer that deactivates a part of data with a certain probability to a general CNN, and a standard deviation of a plurality of outputs that has been subjected to dropout at the time of inference is acquired. The standard deviation is taken as the value of uncertainty, and a value obtained by subtracting the uncertainty value from 1.0 is taken as the reliability (reliability=1.0−uncertainty value).

The personalized detection unit 300 performs detection processing of an area including an object by using a model (personalized model) generated by the learning unit 600 described later. The personalized model can detect a specific object (for example, a face of a specific individual) with higher accuracy than the basic model used by the basic detection unit 200. The algorithm (model type or the like) of the personalized model may be the same as or different from that of the basic detection unit 200. Note that, in a stage where the personalized model is not learned (generated) by the learning unit 600, the processing of the personalized detection unit 300 may not be performed.

The identification unit 400 acquires one or a plurality of sets of information (rectangle information) indicating the area detected by the basic detection unit 200 and detection reliability (detection score). In addition, the identification unit 400 acquires one or a plurality of sets of information (rectangle information) indicating the area detected by the personalized detection unit 300 and detection reliability (detection score). The identification unit 400 performs identification processing on the basis of each set acquired from the basic detection unit 200 and the personalized detection unit 300. In the identification processing, in a case where the object is a human face, identification of an individual (determination of who the face is) is included from the image of the detected area.

Specifically, first, the identification unit 400 generates one feature vector from an image included in the detected area (in this example, an image of a rectangular area) for each set. In a case where the identification unit 400 uses a convolutional neural network (CNN), the feature vector is a feature vector of an arbitrary dimension given as an output of the CNN. The dimension of the feature vector is, for example, 512 dimensions, 128 dimensions, or the like, and is not limited to a specific dimension. In a case where the object is a face, one feature vector is calculated from one face image. In a case where similarity calculation between feature vectors obtained from the same person is performed, a large similarity tends to be calculated. Conversely, in a case where similarity calculation between feature vectors obtained from different persons is performed, a small similarity tends to be calculated. A specific example of the similarity is cosine similarity.

The identification unit 400 identifies the object using the feature vector generated for each set.

As an example of identifying an object, a face image is registered in advance for each individual, a feature vector is calculated from the registered face image, and the feature vector is stored in association with personal identification information (such as a user name or a name) indicating an individual. The identification unit 400 calculates a distance (similarity) between each of the registered feature vectors and the calculated feature vector, and acquires personal identification information corresponding to the feature vector having the minimum distance (highest similarity). The identification unit 400 sets the individual specified by the acquired personal identification information as the identification result. In addition, the identification unit 400 obtains reliability of identification (identification reliability). The identification reliability may be a value that becomes larger as the distance is smaller (as the similarity is larger), or may be defined by other methods.

As another example of identifying an object, an identification model generated in advance by machine learning may be used. For example, a model (identification model) for estimating personal identification information from a feature vector by machine learning using teacher data in which the feature vector and the personal identification information are associated with each other is generated. The teacher data may be acquired by capturing one or a plurality of face images to be identified, calculating a feature vector of each image, and associating personal identification information of each person with the feature vector. The identification unit 400 obtains the personal identification information and the identification reliability by using the above-described calculated feature vector as an input to the identification model. The identification reliability may be based on the uncertainty described in Chang, Jie et al. Data Uncertainty Learning in Face Recognition. 2020 "reliability=1.0–uncertainty". The identification model may be a CNN or another type of regression model.

The identification unit 400 sends the feature vector calculated for each set acquired from the basic detection unit 200 to the learning unit 600 together with the identification reliability and the detection reliability included in the set.

The output unit 500 arranges the information indicating the area detected by the personalized detection unit 300 and the identification result of the object in the input image (for example, superimposed on the input image) and displays the input image on the screen. For example, a rectangular frame is displayed in the area, and an identification result (for example, personal identification information) of the object is displayed in the vicinity of the rectangle. In a case where the area is correctly detected, an object (a face in this example) to be detected is included in the rectangle. The output unit 500 may further display information (rectangle information in this example) indicating the area detected by the basic detection unit 200 and the identification result of the object in superposition with the input image.

Note that, when two or more identical identification results are obtained, the rectangular frame corresponding to the identification result having the higher identification reliability may be preferentially displayed. In addition, it is not necessary to display the detection area in which the detection reliability is less than a certain value. Similarly, it is also possible not to display an identification result whose identification reliability is less than a certain value.

The learning unit 600 performs learning (learning of model parameters) of the personalized model used by the personalized detection unit 300, and realizes enhancement of detection accuracy of the object area in the personalized detection unit 300.

The learning unit 600 includes a clustering calculation unit 610, a label generation unit 620, a storage unit 630, a personalized learning unit 640, and a storage unit 650.

The clustering calculation unit 610 associates the feature vector, the identification reliability, and the detection reliability acquired from the identification unit 400 with each other to form correspondence data, and stores the correspondence data in the storage unit 650. The storage unit 650 also stores correspondence data in which feature vectors acquired from the identification unit 400 in the past, identification reliability, and detection reliability are associated with each other. The storage unit 650 is an arbitrary storage medium such as a memory, an optical disk, or a hard disk.

FIG. 3 schematically illustrates an example of the correspondence data stored in the storage unit 650. In this example, the feature vector is a 512 dimensional feature vector, and each component is indicated by a symbol here, but is actually a real number. Each of the identification reliability and the detection reliability is indicated by a symbol, but is actually a real number.

The clustering calculation unit 610 reads a plurality of feature vectors stored in the storage unit 650, and maps the feature vectors in a feature space having the same number of dimensions as the feature vectors. The clustering calculation unit 610 clusters the feature vectors to generate a plurality of clusters. Each cluster includes (or belongs to) one or more feature vectors. The feature vectors having high similarity are arranged at close places in the feature amount space, and as a result, tend to be classified into the same cluster.

Figures 4, 5:
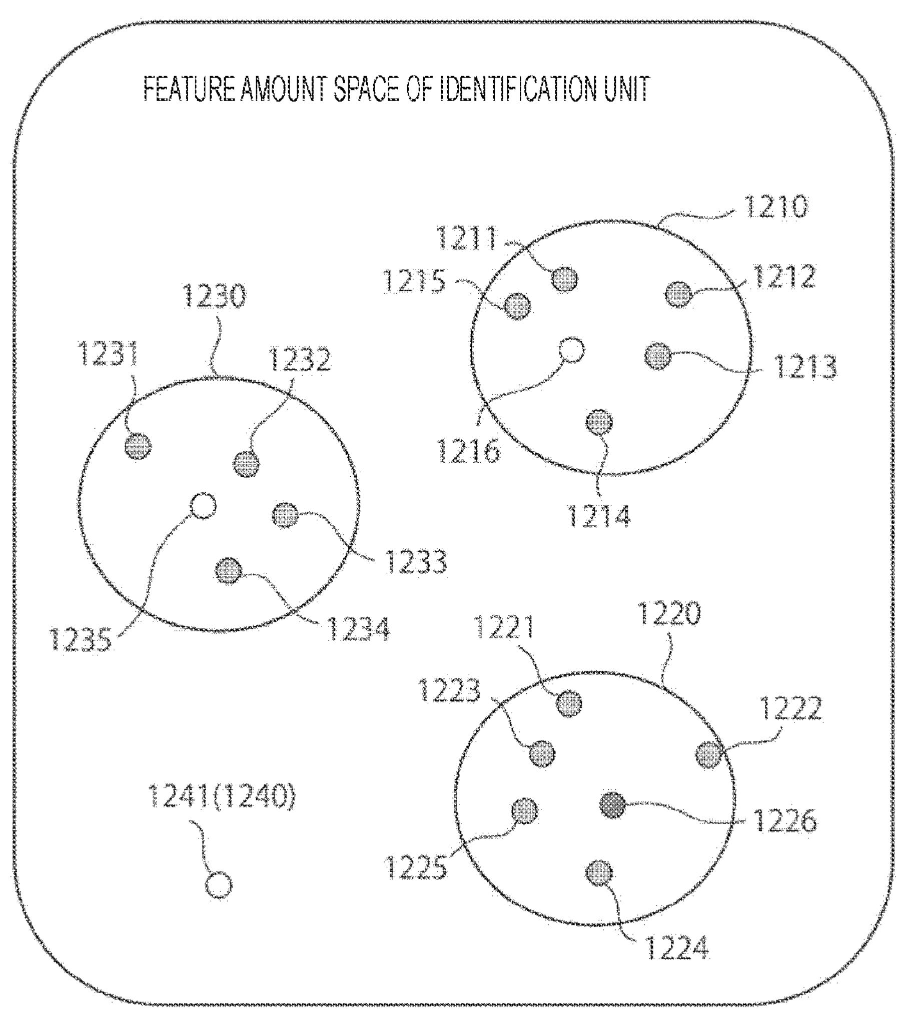
FIG. 4 is a diagram illustrating an example of a feature amount space.
FIG. 5 is a diagram illustrating an example of learning data in which a detection area corresponding to a feature vector is labeled.

FIG. 4 illustrates an example of a feature amount space to which a plurality of feature vectors is mapped. In the feature space, feature vectors acquired in the past and feature vectors acquired this time are mapped. Four clusters 1210, 1220, 1230, and 1240 are generated. As an example, the cluster 1210 corresponds to the face area of the person 11_1 in FIG. 2. The cluster 1220 corresponds to the upper body or the entire body of the person 11_2. The cluster 1230 corresponds to the face area of the person 11_3. The cluster 1240 corresponds to an area of the object 11_4 (in the present embodiment, since a case is assumed where a person's face is detected, the detection of the object 11_4 corresponds to erroneous detection). In a case where objects other than a person's face are also detected, there may be a cluster corresponding to other types of objects (for example, a cluster corresponding to a sofa or the like).

The cluster 1210 includes a feature vector 1211 to 1216. The cluster 1220 includes a feature vector 1221 to 1226. The cluster 1230 includes a feature vector 1231 to 1235. The cluster 1240 includes a feature vector 1241. One feature vector is obtained from one object (one detection target).

The clustering calculation unit 610 selects a feature vector that satisfies a condition on the basis of a result of clustering. Specifically, the clustering calculation unit 610 selects a cluster satisfying a predetermined condition (referred to as a personalized learning condition) from a set of clusters, and selects all feature vectors included in the cluster.

The label generation unit 620 assigns a label indicating the detection area to the detection area corresponding to the feature vector selected by the clustering calculation unit 610. It means that feature vectors given the same label belong to the same cluster. Since the similarity between the feature vectors obtained from the same person is high (located at a close distance in the feature space), it can be said that there is a high possibility that the feature vectors belonging to basically the same cluster are acquired from the same person, and it can be said that there is a high possibility that the detection area corresponding to the selected feature vector is appropriate as the learning target. The label generation unit 620 stores the labeled detection area in the storage unit 630 as learning data (teacher data). The storage unit 630 is an arbitrary storage medium such as a memory, an optical disk, or a hard disk.

Hereinafter, the personalized learning condition used in the processing of selecting a cluster (feature vector) by the clustering calculation unit 610 will be described in detail.

As the personalized learning condition, the cluster may include N or more samples (feature vectors) whose detection reliability is equal to or lower than the threshold td and whose identification reliability is equal to or higher than the threshold tr. This personalized learning condition is effective in a case where the face of a person who cannot be correctly detected (detection accuracy is low) by the basic detection unit 200 is intensively learned, and the object area is detected using the basic detection unit 200 and the personalized detection unit 300 in a complementary manner.

An example of selecting a feature vector using a personalized learning condition will be described with reference to the example of FIG. 4. It is assumed that td=0.5, tr=0.5, and N=6. Here, a case is assumed where the basic detection unit 200 and the personalized detection unit 300 target a person's face.

The cluster 1210 includes a feature vector 1211 to 1215 acquired in the past and a feature vector 1216 acquired this time. With respect to the feature vector 1216 acquired this time, the reliability (detection reliability) 0.7 of the basic detection unit 200 is higher than td (that is, detection with high accuracy by the basic detection unit 200), and the identification reliability 0.9 is tr or more (the identification accuracy is high because the person 11_1 exists nearby). Therefore, "the detection reliability is td or less and the identification reliability is tr or more" is not satisfied for the feature vector 1216. Therefore, although the number of samples of the cluster 1210 has reached N, the cluster 1210 does not satisfy the personalized learning condition.

The cluster 1220 includes a feature vector 1221 to 1225 acquired in the past and a feature vector 1226 acquired this time. With respect to the feature vector 1226, the reliability (detection reliability) 0.4 of the basic detection unit 200 is smaller than td (that is, the detection accuracy in the basic detection unit 200 is low), and the identification reliability 0.6 is tr or more (the person 11_2 faces slightly downward, but the identification accuracy is high because the person exists nearby). Therefore, "the detection reliability is td or less and the identification reliability is tr or more" is satisfied for the feature vector 1226. In addition, it is assumed that "the detection reliability is td or less and the identification reliability is tr or more" is also satisfied for the feature vectors 1221 to 1225 acquired in the past. Therefore, the cluster 1220 satisfies the personalized learning condition of "N or more samples (feature vectors) whose detection reliability is equal to or lower than the threshold td and whose identification reliability is equal to or higher than the threshold tr are included in the cluster".

The cluster 1230 includes a feature vector 1231 to 1234 acquired in the past and a feature vector 1235 acquired this time. With respect to the feature vector 1235, it is assumed that the reliability (detection reliability) 0.4 of the basic detection unit 200 is td or less (that is, the detection accuracy in the basic detection unit 200 is low), and the identification reliability 0.3 is smaller than tr (the identification accuracy is low because the person 11_2 is far and faces sideways). Therefore, "the detection reliability is td or less and the identification reliability is tr or more" is not satisfied for the feature vector 1235. In addition, the number of samples of the cluster 1220 does not reach N. Therefore, the cluster 1230 does not satisfy the personalized learning condition.

The cluster 1240 includes the feature vector 1241 acquired this time. With respect to the feature vector 1241, the reliability 0.2 of the basic detection unit 200 is smaller than td (the object included in the detection area is not a human face), and the reliability 0.2 of the identification unit is smaller than tr (the object included in the detection area is not a human face). The number of samples of the cluster 1240 does not reach N. Therefore, the cluster 1240 does not satisfy the personalized learning condition.

Next, the label generation unit 620 receives the feature vector satisfying the personalized learning condition from the clustering calculation unit 610, and labels the detection area corresponding to the feature vector. The format of the label may be arbitrary as long as it is information that can specify the detection area.

For example, the label may be defined by a set of coordinates of one vertex of the rectangular area, a horizontal width, and a vertical width. In addition, the label may be defined by a set of coordinates of vertices facing each other in the rectangular area. If the detection area is a circle, the label may be defined by the center and the radius. The label may be defined by other methods. The labeled detection area has a feature that the feature vector calculated from the image of the detection area belongs to a cluster (for example, the above-described cluster 1220) satisfying the personalized learning condition. The label generation unit 620 transmits the label and the like of the labeled detection area to the storage unit 630.

The storage unit 630 receives and stores the label and the like of the labeled detection area from the label generation unit 620. The label or the like of the labeled detection area is used by the personalized learning unit 640 as learning data (teacher data).

FIG. 5 illustrates an example of learning data stored in the storage unit 630. An example in which a label is assigned to a detection area corresponding to a feature vector will be described. In this example, the label is defined by upper left coordinates ($x_i$, $y_i$), the horizontal width $w_i$, and the vertical width $h_i$. Instead of the upper left coordinate, a central coordinate or another appropriate representative point may be used. The label may be defined in other forms, such as a set of upper left and lower right coordinates of the area. In addition, an index, an input image (or identification information such as a file name of the input image), a feature vector, and a cluster name are stored. Note that, in the example of FIG. 5, the input images of the indexes 1 and 2 are both $I_1$, which means that the detection areas indicated by the labels corresponding to the indexes 1 and 2 are included in the same input image. The cluster name A, the cluster name B, and the like are symbols for identifying a cluster. The image in the area indicated by the label in the input image corresponds to the image in the detection area.

Figures 6, 7:
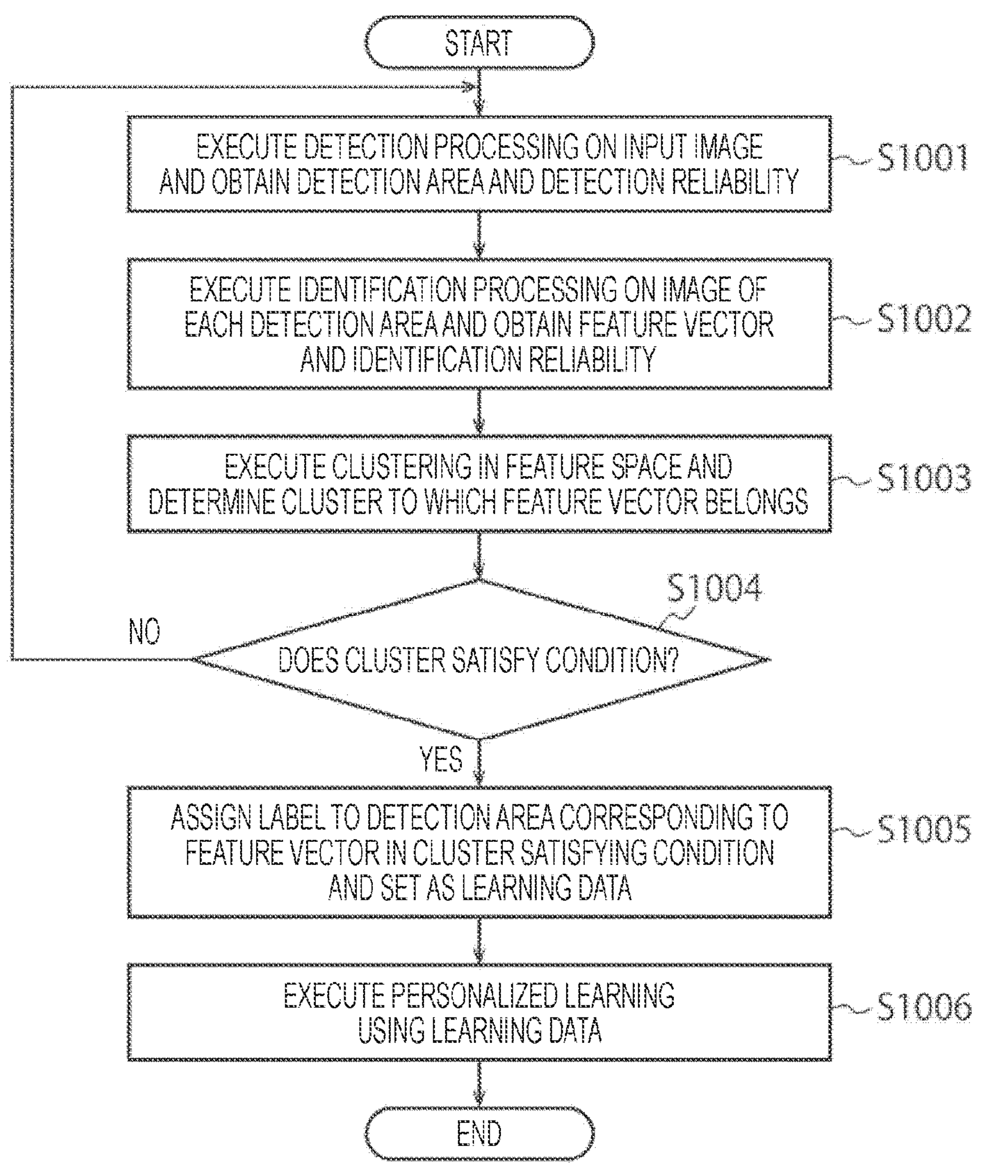
FIG. 6 illustrates another example of learning data.
FIG. 7 is a flowchart for explaining an example of a flow of processing of the information processing apparatus according to an embodiment of the present disclosure.

Instead of the input image and the label, an image of the detection area may be stored. FIG. 6 illustrates an example of learning data in this case. Instead of the input image and the label, an image ($dI_1$, $dI_2$, . . . ) of the detection area is stored. A link to the image of the detection area may be stored instead of the image of the detection area itself, and the image of the detection area may be stored in a storage area different from the learning data. In addition, an image with a margin obtained by adding a certain margin to the periphery of the image of the detection area may be stored. For example, the processing of detecting the candidate of the face area is performed on the image of the detection area as described above, but there is a case where the image with the margin is used in a case where the image with the margin is used in a case where fine-tuning is performed only on the classification of whether or not the image is the face. As an example of the margin, an area having a constant pixel width surrounding the periphery of the rectangular area may be used.

In the examples of FIGS. 5 and 6, the feature vector and the cluster name are stored, but at least one of the feature vector or the cluster name may be omitted. In addition, a feature vector or a cluster name can be used for learning. For example, the cluster name can be used to make the distribution of the appearance frequency uniform between clusters.

The personalized learning unit 640 performs the personalized learning on the basis of the learning data stored in the storage unit 630. Specifically, the personalized learning unit 640 acquires learning data from the storage unit 630, and learns the parameters of the personalized model using the image of the detection area indicated by the label. Using the image of the detection area to which the label is assigned as a positive example, the parameter is learned so as to increase the detection accuracy. For example, if the personalized model is a CNN, the weight of the CNN is updated. By such learning, it is possible to detect a face area having a high appearance frequency but not being detected by the basic detection unit 200 with high accuracy.

The personalized learning unit 640 transmits the learned result (for example, the updated model or the updated weight) to the personalized detection unit 300, and updates the personalized model used by the personalized detection unit 300. As a result, the personalized detection unit 300 can detect the face of the same person with higher accuracy.

FIG. 2 described above illustrates an example of an area detected by the detection processing in a case where the detection target is a face in the personalized learning unit 640. An area 1110 is detected for the person 11_1, an area 1120 is detected for the person 11_2, an area 1130 is detected for the person 11_3, and an area 1140 is detected for the object 11_4. In this example, the areas 1110 and 1130 include faces, and detection accuracy is high. The area 1120 includes not only the face but also the entire upper body, and the detection accuracy is not so high. The area 1140 includes not a human but an object, and detection accuracy is low. As the personalized learning progresses, it can be expected that a more accurate face area can be detected for the person 11_2. Further, it can be expected that the object 11_4 is not detected. Here, an example in which the detection target is a face has been described, but a similar effect can be obtained in a case where another object is set as the detection target.

FIG. 7 is a flowchart illustrating an example of processing of personalized learning in the information processing apparatus 10 according to the embodiment of the present disclosure. In the present embodiment, an example in which the detection target is a human face is illustrated, but the present invention is not limited thereto.

The basic detection unit 200 executes face detection processing on the image input from the image input unit 100, and obtains a detection result (information of the detection area) and reliability of the detection result (detection reliability) (S1001).

The identification unit 400 executes identification processing of an object (face) on the image of the above-described detection area in the input image, and obtains a feature vector and identification reliability (S1002).

The clustering calculation unit 610 maps the feature vectors acquired in step S1002 and the feature vectors acquired in the past on the feature amount space, and performs clustering of the feature vectors in the feature amount space (S1003). As a result, one or more clusters are generated. Each cluster includes one or more feature vectors.

The clustering calculation unit 610 determines whether each cluster satisfies the personalized learning condition (S1004). In a case where the personalized learning condition is satisfied, the process proceeds to step S1005, and in a case where the personalized learning condition is not satisfied, the process returns to step S1001.

Note that clusters determined to satisfy the personalized learning condition in the past may be excluded from the targets of the personalized learning. Alternatively, the threshold N of the number of samples (the number of feature vectors) may be changed to a high value for the cluster corresponding to the individually-learned face, and learning may be repeatedly performed. Whether or not the cluster corresponds to the individually-learned face may be determined, for example, by determining whether the position of the center of gravity of the cluster is within a certain distance of the center of gravity of the past cluster. In a case where both clusters are within a certain distance, it may be determined that both clusters are clusters corresponding to the same face (detection target).

The label generation unit 620 assigns a label that can identify the detection area corresponding to the feature vector to the feature vector belonging to the cluster satisfying the personalized learning condition (S1005). A detection area or an image of a detection area corresponding to a labeled feature vector is used as learning data (teacher data) in personalized learning.

The personalized learning unit 640 learns the personalized model used by the personalized detection unit 300 by executing the personalized learning on the basis of the learning data kept in the storage unit 630 (S1006).

As described above, according to the present embodiment, the image of the area detected by the basic detection unit 200 is identified by the identification unit 400, and the personalized model is learned on the basis of the image of the area having low detection reliability and high identification reliability. As a result, it is possible to automatically generate in real time the personalized model in which the performance of the area detection with respect to the input image is higher than that of the basic detection unit 200.

Modification 1

The personalized learning condition is not limited to the above example. As Variation 1 of the personalized learning condition, there may be N or more samples whose identification reliability is tr or more. In this case, the detection reliability is not used in the determination of the success or failure of the personalized learning condition. It can be expected that the personalized learning condition of variation 1 enhances the function of the personalized detection unit 300, eventually stops the detection operation of the basic detection unit 200, and enables detection only by the personalized detection unit.

As Variation 2 of the personalized learning condition, a condition that the detection reliability average is td or less and the identification reliability average is tr or more may be used. The personalized learning condition of Variation 2 is effective in a case where there is a margin in the capacity of the memory available to the information processing apparatus 10 and there is no restriction on the number of samples.

Modification 2

In the above-described embodiment, the detection accuracy of the area is improved mainly for the face as a part of the human body, but a part other than the face of the human body may be targeted. In addition, an animal other than a human, or a specific pet may be targeted. In addition, objects other than living things, for example, furniture in a house, and the like may be targeted.

Modification 3

In the embodiment described above, the basic detection unit 200 and the personalized detection unit 300 are used in combination. However, in a case where the detection accuracy of the personalized detection unit 300 is sufficiently improved by repeating the personalized learning by the learning unit 600, the basic detection unit 200 may not be used. That is, the function of the basic detection unit 200 may be turned off.

Modification 4

The personalized detection unit 300 may be initialized to initialize the parameters of the personalized model. This enables redoing in a case where the accuracy of the personalized detection unit 300 is not improved. It is also possible to cope with a case where a robot including the present device is transferred to another home or another user.

Modification 5

In the embodiment described above, the personalized learning is performed using the images of the entire detection area (sample) and the detection area satisfying the personalized learning condition. In a case where the number of samples (the number of detection areas) is large, the samples may be divided into a plurality of groups, and learning may be performed a plurality of times. For example, 128 samples may be divided into 16 groups including 8 samples, and personalized learning may be performed 16 times. This has an advantage that the calculation load can be reduced. In addition, improvement in learning accuracy can be expected.

Modification 5

The information processing apparatus 10 is not limited to being physically integrated, and a part of the components may exist on a network as another device and be able to communicate with the information processing apparatus 10. For example, the learning unit 600 (clustering calculation unit, label generation unit, storage unit, and personalized learning unit) may be a device that provides a cloud service on a network. For example, the update of the weight of the CNN is calculated by the cloud, and the weight is downloaded and applied to the personalized detection unit 300.

Application Example

Hereinafter, an application example of the information processing apparatus 10 will be described. Note that the information processing apparatus 10 described above can also be applied to an arbitrary system, device, method, and the like of the following information processing apparatus 10.

FIG. 8 illustrates an information processing system 1000 as an example of a hardware configuration of a computer that executes a series of processes of the information processing apparatus 10 of the present disclosure by a program. In the computer, a central processing unit (CPU) 1001, a read only memory (ROM) 1002, and a random access memory (RAM) 1003 are connected to one another via a bus 1004.

An input/output interface 1005 is also connected to the bus 1004. An input unit 1006, an output unit 1007, a storage unit 1008, a communication unit 1009, and a drive 1010 are connected to the input/output interface 1005.

The input unit 1006 includes, for example, a keyboard, a mouse, a microphone, a touch panel, an input terminal, and the like. The output unit 1007 includes, for example, a display, a speaker, an output terminal, and the like. The storage unit 1008 includes, for example, a hard disk, a RAM disk, a nonvolatile memory, and the like. The communication unit 1009 includes, for example, a network interface. The drive drives a removable medium such as a magnetic disk, an optical disk, a magneto-optical disk, or a semiconductor memory.

In the computer configured as described above, for example, the CPU 1001 loads a program stored in the storage unit 1008 into the RAM 1003 via the input/output interface 1005 and the bus 1004 and executes the program, and thus the above-described series of processes is performed. Furthermore, the RAM 1003 also appropriately stores data necessary for the CPU 1001 to execute various processes, and the like.

The program executed by the computer can be applied by being recorded on, for example, the removable medium as a package medium or the like. In this case, the program can be installed in the storage unit 1008 via the input/output interface 1005 by attaching the removable medium to the drive 1010.

Furthermore, the program can also be provided via a wired or wireless transmission medium such as a local area network, the Internet, or digital satellite broadcasting. In this case, the program can be received by the communication unit 1009 and installed in the storage unit 1008.

The present embodiment is not limited to software processing using a CPU, and may be realized by processing by a graphical processing unit (GPU) and a digital signal processor (DSP) (for example, a Snapdragon Neural Processing Engine or a technology similar thereto can be used). The present device can also be realized by a chip that executes the processing of the present embodiment.

The steps of the processing disclosed in the present specification may not necessarily be performed in the order described in the flowchart. For example, the steps may be executed in an order different from the order described in the flowchart, or some of the steps described in the flowchart may be executed in parallel.

Note that the present invention is not limited to the embodiments described above as it is, and can be embodied by modifying the components without departing from the gist thereof in the implementation stage.

Furthermore, various inventions can be formed by appropriately combining the plurality of components disclosed in the embodiments described above. For example, some components may be deleted from all the components illustrated in the embodiments. Moreover, the components of different embodiments may be appropriately combined.

Furthermore, the effects of the present disclosure described in the present specification are mere examples, and other effects may be provided.

Note that the present disclosure can have the following configurations.

Claims

Item 1

An information processing apparatus including:

a first detection unit that performs detection processing of detecting an area including an object with respect to an input image;

an identification unit that calculates a feature vector on the basis of an image of an area detected in the detection processing, identifies the object on the basis of the feature vector, and acquires identification reliability that is reliability of an identification result of the object; and a learning unit that selects a detection area for learning from a plurality of detection areas corresponding to a plurality of the feature vector on the basis of a plurality of the identification reliability, and learns a model that detects an area including the object on the basis of an image of the detection area selected.

Item 2

The information processing apparatus according to item 1, in which the first detection unit acquires detection reliability that is reliability of the area detected by the detection processing, and the learning unit selects the detection area on the basis of a plurality of the detection reliability.

Item 3

The information processing apparatus according to item 1 or 2, further including a second detection unit that performs detection processing of detecting an area including the object with respect to the input image or another input image on the basis of the model.

Item 4

The information processing apparatus according to any one of items 1 to 3, in which the learning unit is configured to:

cluster a plurality of the feature vector to generate at least one cluster including the feature vector;

select a cluster from the at least one cluster on the basis of a plurality of the identification reliability; and select a detection area corresponding to the feature vector included in the cluster selected.

Item 5

The information processing apparatus according to item 4, in which the first detection unit acquires detection reliability that is reliability of the area detected by the detection processing, and the learning unit selects the cluster on the basis of a plurality of the detection reliability.

Item 6

The information processing apparatus according to item 5, in which the learning unit selects a cluster in which the number of feature vectors of which the detection reliability is less than a first threshold and the identification reliability is equal to or greater than a second threshold has reached a predetermined number.

Item 7

The information processing apparatus according to item 5, in which the learning unit selects a cluster in which an average of the detection reliability is less than a first threshold and an average of the identification reliability is equal to or greater than a second threshold.

Item 8

The information processing apparatus according to item 4, in which the learning unit selects a cluster in which the number of feature vectors of which the identification reliability is equal to or greater than a second threshold has reached a predetermined number.

Item 9

The information processing apparatus according to item 3, further including an output unit that arranges information indicating the area detected by the second detection unit in the input image or the another input image.

Item 10

The information processing apparatus according to item 3 or 9, in which the identification unit calculates a feature vector on the basis of an image of the area detected by the second detection unit, and identifies the object on the basis of the feature vector.

Item 11

The information processing apparatus according to any one of items 1 to 10, in which the object is a human body or a part of a human body.

Item 12

The information processing apparatus according to item 11, in which the part of the human body is a face.

Item 13

An information processing method in which a computer executes:

performing detection processing of detecting an area including an object with respect to an input image;

calculating a feature vector on the basis of an image of an area detected in the detection processing, identifying the object on the basis of the feature vector, and acquiring identification reliability that is reliability of an identification result of the object; and selecting a detection area for learning from a plurality of detection areas corresponding to a plurality of the feature vector on the basis of a plurality of the identification reliability, and learning a model that detects an area including the object on the basis of an image of the detection area selected.

Item 14

A computer program for causing a computer to execute:

a step of performing detection processing of detecting an area including an object with respect to an input image;

a step of calculating a feature vector on the basis of an image of an area detected in the detection processing, identifying the object on the basis of the feature vector, and acquiring identification reliability that is reliability of an identification result of the object; and a step of selecting a detection area for learning from a plurality of detection areas corresponding to a plurality of the feature vector on the basis of a plurality of the identification reliability, and learning a model that detects an area including the object on the basis of an image of the detection area selected.

REFERENCE SIGNS LIST

11 Person
100 Image input unit
200 Basic detection unit (first detection unit)
300 Personalized detection unit (second detection unit)
400 Identification unit
500 Output unit
600 Learning unit
610 Clustering calculation unit
620 Label generation unit
630 Storage unit
640 Personalized learning unit
1001 CPU
1002 ROM
1003 RAM
1004 Bus
1005 Input/output interface
1006 Input unit
1007 Output unit
1008 Storage unit
1009 Communication unit
1010 Drive
110 Sensor unit
1200 Image
1110, 1120, 1130, 1140 Detected area
1210, 1220, 1230, 1240 Cluster
1211 to 1216, 1221 to 1226, 1231 to 1235, 1241 Feature vector

The invention claimed is:

1. An information processing apparatus comprising circuitry configured to:

perform detection processing of detecting an area including an object with respect to an input image;

calculate a feature vector on a basis of an image of an area detected in the detection processing, identifies the object on a basis of the feature vector, and acquires identification reliability that is reliability of an identification result of the object; and select a detection area for learning from a plurality of detection areas corresponding to a plurality of the feature vector on a basis of a plurality of the identification reliability, and learns a model that detects an area including the object on a basis of an image of the detection area selected.

2. The information processing apparatus according to claim 1, wherein circuitry acquires detection reliability that is reliability of the area detected by the detection processing, and selects the detection area on a basis of a plurality of the detection reliability.

3. The information processing apparatus according to claim 1, wherein the circuitry is further configured to perform detection processing of detecting an area including the object with respect to the input image or another input image on a basis of the model.

4. The information processing apparatus according to claim 3, wherein the circuitry is further configured to arrange information indicating the detected area including the object in the input image or the another input image.

5. The information processing apparatus according to claim 3, wherein the circuitry calculates a feature vector on a basis of an image of the detected area including the object, and identifies the object on a basis of the feature vector.

6. The information processing apparatus according to claim 1, wherein the circuitry is further configured to:

cluster a plurality of the feature vector to generate at least one cluster including the feature vector;

select a cluster from the at least one cluster on a basis of a plurality of the identification reliability; and select a detection area corresponding to the feature vector included in the cluster selected.

7. The information processing apparatus according to claim 6, wherein the circuitry acquires detection reliability that is reliability of the area detected by the detection processing, and selects the cluster on a basis of a plurality of the detection reliability.

8. The information processing apparatus according to claim 7, wherein the circuitry selects a cluster in which the number of feature vectors of which the detection reliability is less than a first threshold and the identification reliability is equal to or greater than a second threshold has reached a predetermined number.

9. The information processing apparatus according to claim 7, wherein the circuitry selects a cluster in which an average of the detection reliability is less than a first threshold and an average of the identification reliability is equal to or greater than a second threshold.

10. The information processing apparatus according to claim 6, wherein the circuitry selects a cluster in which the number of feature vectors of which the identification reliability is equal to or greater than a second threshold has reached a predetermined number.

11. The information processing apparatus according to claim 1, wherein the object is a human body or a part of a human body.

12. The information processing apparatus according to claim 11, wherein the part of the human body is a face.

13. An information processing method in which a computer executes:

performing detection processing of detecting an area including an object with respect to an input image;

calculating a feature vector on a basis of an image of an area detected in the detection processing, identifying the object on a basis of the feature vector, and acquiring identification reliability that is reliability of an identification result of the object; and selecting a detection area for learning from a plurality of detection areas corresponding to a plurality of the feature vector on a basis of a plurality of the identification reliability, and learning a model that detects an area including the object on a basis of an image of the detection area selected.

14. A non-transitory computer-readable medium having embodied thereon a computer program, which when executed by a computer causes the computer to execute a method, the method comprising:

performing detection processing of detecting an area including an object with respect to an input image;

calculating a feature vector on a basis of an image of an area detected in the detection processing, identifying the object on a basis of the feature vector, and acquiring identification reliability that is reliability of an identification result of the object; and selecting a detection area for learning from a plurality of detection areas corresponding to a plurality of the feature vector on a basis of a plurality of the identification reliability, and learning a model that detects an area including the object on a basis of an image of the detection area selected.

* * * * *